(12) United States Patent
Trappolini et al.

(10) Patent No.: US 9,046,149 B2
(45) Date of Patent: Jun. 2, 2015

(54) STARTER ALTERNATOR ASSEMBLY COMPRISING A POLI-V BELT AND POLI-V BELT

(75) Inventors: Carlo Trappolini, Montesilvano (IT); Marco Di Meco, Pescara (IT)

(73) Assignee: Dayco Europe S.R.L. (IT)

( * ) Notice: Subject to any disclaimer, the term of this patent is extended or adjusted under 35 U.S.C. 154(b) by 619 days.

(21) Appl. No.: 12/999,525

(22) PCT Filed: Jun. 19, 2008

(86) PCT No.: PCT/IT2008/000408
§ 371 (c)(1),
(2), (4) Date: Aug. 4, 2011

(87) PCT Pub. No.: WO2009/153816
PCT Pub. Date: Dec. 23, 2009

(65) Prior Publication Data
US 2011/0281676 A1   Nov. 17, 2011

(51) Int. Cl.
| F16G 9/00 | (2006.01) |
| F16H 7/12 | (2006.01) |
| F16G 5/00 | (2006.01) |
| F16G 5/08 | (2006.01) |
| F16H 7/08 | (2006.01) |

(52) U.S. Cl.
CPC ............... *F16G 5/08* (2013.01); *F16H 7/1281* (2013.01); *F16H 2007/0874* (2013.01)

(58) Field of Classification Search
CPC ............... F16G 5/00; F16G 5/04; F16G 5/20
USPC .................. 474/101, 237–272, 134
See application file for complete search history.

(56) References Cited

U.S. PATENT DOCUMENTS

| 4,758,208 A * | 7/1988 | Bartos et al. ............... 474/135 |
| 5,267,908 A * | 12/1993 | White et al. ............... 474/139 |
| 5,501,643 A * | 3/1996 | Isshiki et al. ............... 474/268 |
| 6,176,799 B1 * | 1/2001 | Kinoshita et al. ............ 474/237 |
| 6,830,524 B2 * | 12/2004 | Tamai ............................ 474/134 |
| 7,258,639 B2 * | 8/2007 | Tachibana et al. ............ 474/237 |

(Continued)

FOREIGN PATENT DOCUMENTS

| CN | 1535363 A | 10/2004 |
| EP | 1489207 A | 12/2004 |
| EP | 1596098 A | 11/2005 |
| EP | 1616993 A | 1/2006 |
| EP | 1669637 A | 6/2006 |
| FR | 2819872 A | 7/2002 |
| WO | WO 01/18291 A | 3/2001 |
| WO | WO 02/090145 A | 11/2002 |
| WO | WO 2004/090224 A | 10/2004 |
| WO | WO 2005/080820 A | 9/2005 |
| WO | WO 2006/051094 A | 5/2006 |

OTHER PUBLICATIONS

Office action issued by Chinese Patent Office dated Aug. 31, 2012 for corresponding Chinese Application No. 200880130621.4 with full English translation.

*Primary Examiner* — William E Dondero
*Assistant Examiner* — Minh Truong
(74) *Attorney, Agent, or Firm* — Thompson Hine LLP

(57) ABSTRACT

Starter-alternator assembly including a poly-V belt comprising a body made of elastomeric material, a plurality of filiform resistant inserts longitudinally embedded in the body, and a coupling portion integrally connected to the body and comprising a plurality of V-shaped ribs set alongside one another and alternating with V-shaped grooves. The belt has a dynamic modulus, with a tensile force pre-set at 600 N at a frequency 15 Hz, that after 10 000 cycles is higher than 110 000 N/rib/branch, and is advantageously made with resistant inserts obtained from at least one first fiber material and one second fiber material.

10 Claims, 7 Drawing Sheets

(56) References Cited

U.S. PATENT DOCUMENTS

| | | | |
|---|---|---|---|
| 2002/0039944 A1* | 4/2002 | Ali et al. | 474/135 |
| 2002/0042317 A1* | 4/2002 | South | 474/264 |
| 2002/0142147 A1 | 10/2002 | Sogabe et al. | |
| 2002/0165058 A1 | 11/2002 | Swope | |
| 2004/0048709 A1* | 3/2004 | Knutson | 474/266 |
| 2006/0100051 A1* | 5/2006 | Di Giacomo et al. | 474/170 |
| 2006/0154769 A1 | 7/2006 | Rognon et al. | |
| 2006/0154770 A1* | 7/2006 | Takaba et al. | 474/263 |
| 2007/0060430 A1* | 3/2007 | Alden et al. | 474/237 |
| 2007/0082777 A1* | 4/2007 | Nishida et al. | 474/237 |
| 2007/0232429 A1* | 10/2007 | Knox | 474/205 |
| 2007/0281814 A1* | 12/2007 | Baldovino et al. | 474/205 |

* cited by examiner

STARTER ALTERNATOR ASSEMBLY COMPRISING A POLI-V BELT AND POLI-V BELT

This application is a 371 of PCT/IT2008/000408 filed on Jun. 19, 2008, published on Dec. 23, 2009 under publication number WO 2009/153816 A.

TECHNICAL FIELD

The present invention relates to a drive belt, particularly for driving accessory members of an internal-combustion engine, of the multiple-groove or poly-V type. In particular, the poly-V belt according to the present invention is applied in a belt drive that connects an engine shaft of the internal-combustion engine with a reversible electric machine, or motor-alternator, commonly known as "starter-alternator", having the dual function of starting motor and of current generator.

BACKGROUND ART

A belt drive for accessories generally comprises a drive pulley connected to a crankshaft of the internal-combustion engine of a motor vehicle, at least one second pulley and one third pulley connected respectively to an alternator and to an accessory, for example a hydraulic pump, and a belt for connecting the pulleys together.

In order to start the engine in a fast and silent way, in the engineer it is necessary for the torque supplied by the electric machine to be very high, and this need is particularly felt in motors of the so-called "start and stop" type, which include a starter-alternator, i.e., in some cases a torque of up to 70-90 Nm. Consequently, upstream and downstream of the alternator there is a difference of tensile force on the belt. It is possible to calculate the amount of the difference in tensile force via the ratio between the torque and the radius of the pulley of the alternator. If we assume the aforesaid value of 90 Nm as torque and that the diameter of the pulley of the alternator is 0.054 m, we obtain a value of difference of tensile force of 90 Nm/0.027 N=3300 N, which is a very high value to which the belt is subjected at each engine starting. Furthermore, to be added to said difference of tensile force are the effects of the inertial torques.

In addition, during the starting step, until the combustion has reached the steady-state condition, there occur irregularities of combustion that induce a fluctuating torque on the belt drive.

Said fluctuating torque interacts with the inertia of the accessories driven in rotation by the belt drive, and in particular with that of the alternator, which is the accessory with the highest inertia. The consequent stresses can jeopardize the duration of the belt. This problem is particularly felt in motor vehicles provided with starter-alternator assemblies which are turned off and started again at each stoppage of the vehicle, and in which consequently the belt is required to withstand a very high number of cycles of starting of the vehicle. In particular, according to the requirements of automotive manufacturers, the belts of the starter-alternator assemblies must in fact withstand even up to 700 000 starts without presenting failure.

The resistant inserts are arranged in the belt not exactly in a longitudinal direction, and hence generally there are four resistant inserts in the length of the belt, which do not form a complete circle within the belt, i.e., two inserts per side of the belt no longer form a complete loop that covers the entire length of the belt internally. For example, the situation may arise as illustrated schematically in FIG. 1, where the reference numbers 1 and 2 designate two of the four resistant inserts that do not form a complete loop that covers the entire length of the belt internally.

On the resistant inserts that do not form a complete loop, there is no longer exerted a balancing force in the opposite direction, but rather it is the mix forming the body of the belt that pulls these resistant inserts and undergoes deformation.

On account of the peaks of tensile force, the deformation of the mix and hence of the belt is very high and, even though the adhesion of the resistant insert to the mix surrounding it is high, the aforesaid resistant inserts that do not form a loop that covers the entire length of the belt internally eventually tend to come out of the belt according to the so-called "cord-pop-out phenomenon", which consequently leads to a decay of the mix in a short time and eventually to failure of the belt.

Finally, on account of the different stiffness, belts with resistant inserts made of different materials undergo an elongation that is markedly different. Consequently, considering only the contribution of the rubber, the generation of heat due hysteresis is very different for resistant inserts made of different materials.

Belts including resistant inserts operate at very high temperatures in steady state running conditions. The high temperature leads to an elongation, which hence results in an increase in creep of the belt.

In addition, known resistant inserts are generally made of polyester, PET, or polyaramide.

Both resistant inserts made of polyester and those made of polyaramide present a high degree of elongation and consequent problems of decay of the ultimate strength over time.

OBJECT OF THE INVENTION

The aim of the present invention is to provide a drive belt of the poly-V type, particularly for driving accessory members of an internal-combustion engine that will enable the problems set forth above to be solved.

In particular, preferably the belt must withstand at least 300 000 starts in a drive assembly of the starter-alternator type.

BRIEF DESCRIPTION OF THE DRAWINGS

For a better understanding of the present invention, there now follows a description thereof with reference to the attached drawings, wherein.

DESCRIPTION OF THE INVENTION

Figure 2:
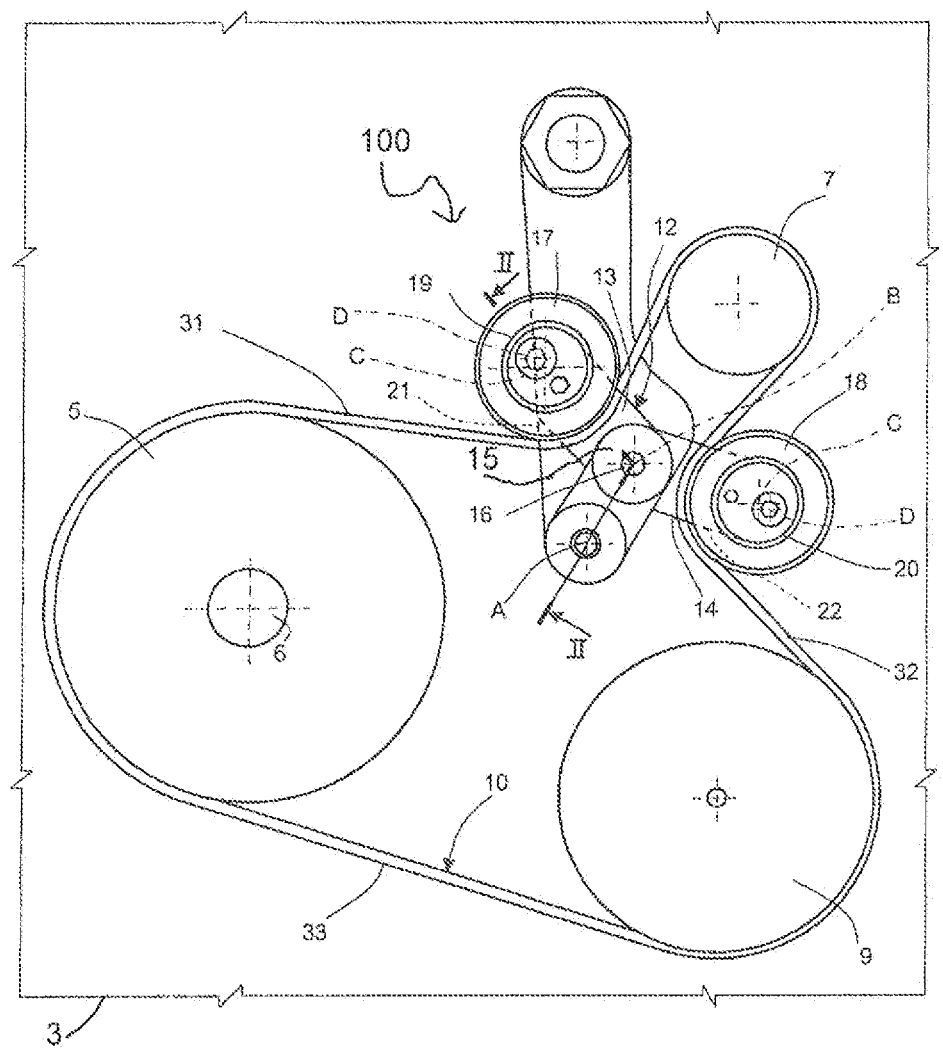
FIG. 2 is a schematic view of a belt drive for driving accessory members of an internal-combustion engine of a motor vehicle, using a belt according to the present invention.

With reference to FIG. 2, designated as a whole is a belt drive for driving a plurality of accessory members of an internal-combustion engine.

Designated as a whole by 100 in FIG. 2 is a belt drive for an internal-combustion engine of a motor vehicle, comprising a first pulley 5 connected to an engine shaft 6 of the engine and set on an outer wall of the engine, a second pulley 7 carried by an output shaft 8 of a motor-alternator, not illustrated, and a third pulley 9 for driving an accessory (which is not illustrated either), for example, a compressor of an air-conditioning system, a belt 10 run over the aforesaid pulleys, and a tensioner 12 hinged to a fixed axis A on the outer wall.

The tensioner 12 comprises a rigid element having two rectilinear arms 13, 14 set at 150° with respect to one another and diverging from a plane connection portion 15, and a pin 16 coming out of the connection portion 15 and having an axis 13 perpendicular to the connection portion 15.

In addition, the tensioner 2 comprises a pair of idler pulleys 17, 18 carried at free ends 21 and 22 of the arms 13, 14 via respective eccentric cams 19, 20 radially contained within the overall dimensions of the respective pulley 17, 18.

The belt 10, for example of a poly-V type, is run over the pulleys 5, 7 and 9 and passes between the idler pulleys 17, 18 forming a closed path having a first branch 31 comprised between the first pulley 5 and the second pulley 7, a second branch 32 comprised between the second pulley 7 and the third pulley 9, and a third branch 33 comprised between the third pulley 9 and the first pulley 5.

Figure 3:
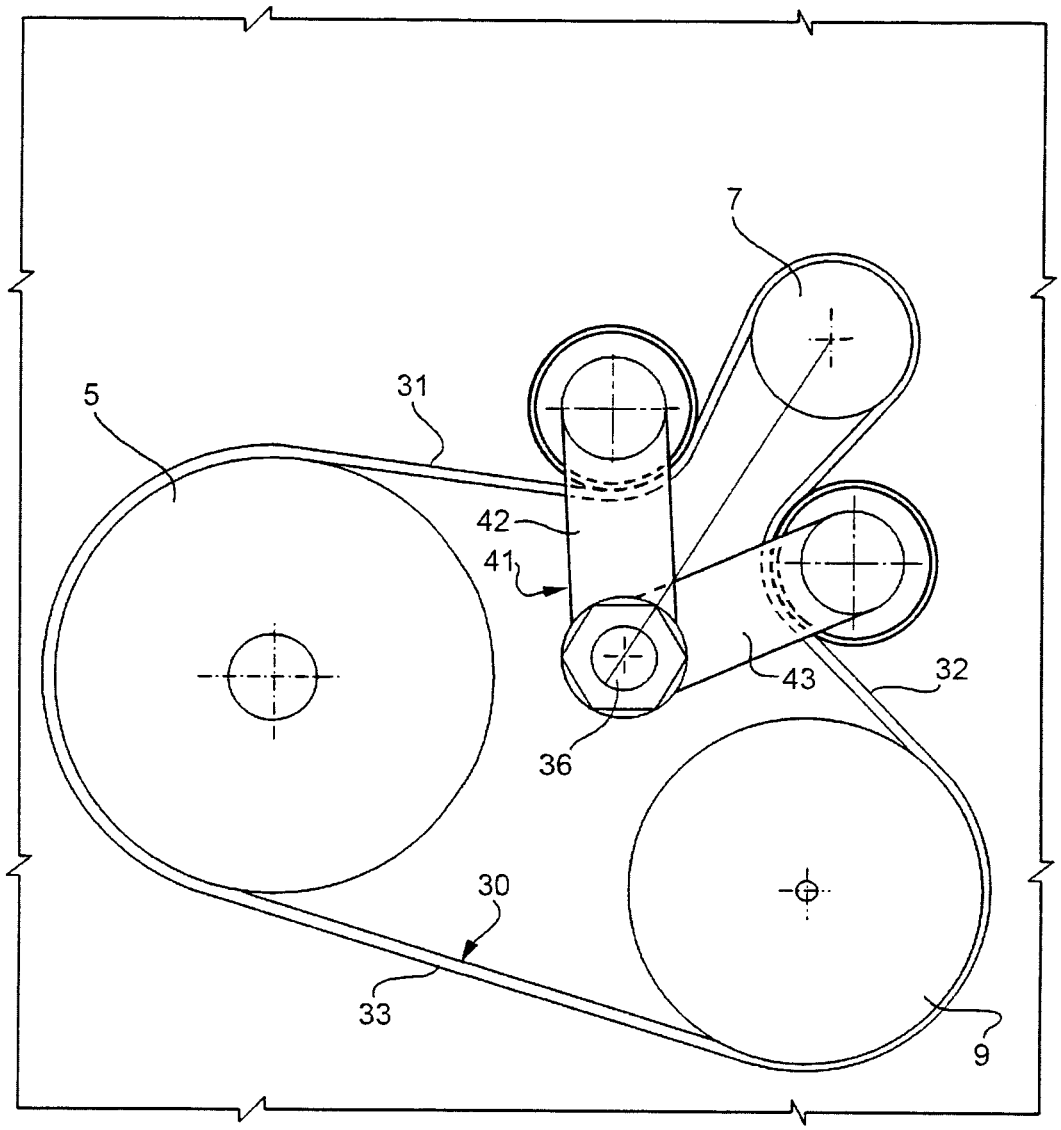
FIG. 3 is a schematic view of a belt drive alternative to the previous one for driving accessory members of an internal-combustion engine of a motor vehicle, using a belt according to the present invention.

As an alternative, the belt according to the present invention can also be used in the drive assembly of FIG. 3.

In FIG. 3, numbers that are the same as the ones of FIG. 2 designate elements that are functionally similar.

The drive assembly comprises a tensioner 41 having two arms 42 and 43. In said belt drive the arms are elastically connected to one another and are able to rotate with respect to a fixed casing, for example, like the double-arm tensioner illustrated and described in the patent application No. EP1596098 filed in the name of the present applicant.

Alternatively, the belt of the present invention can also be used in a drive assembly comprising a tensioner having two arms rigidly connected to one another and rotatable with respect to a fixed axis.

The belt 10 is of the poly-V type.

Figure 1:
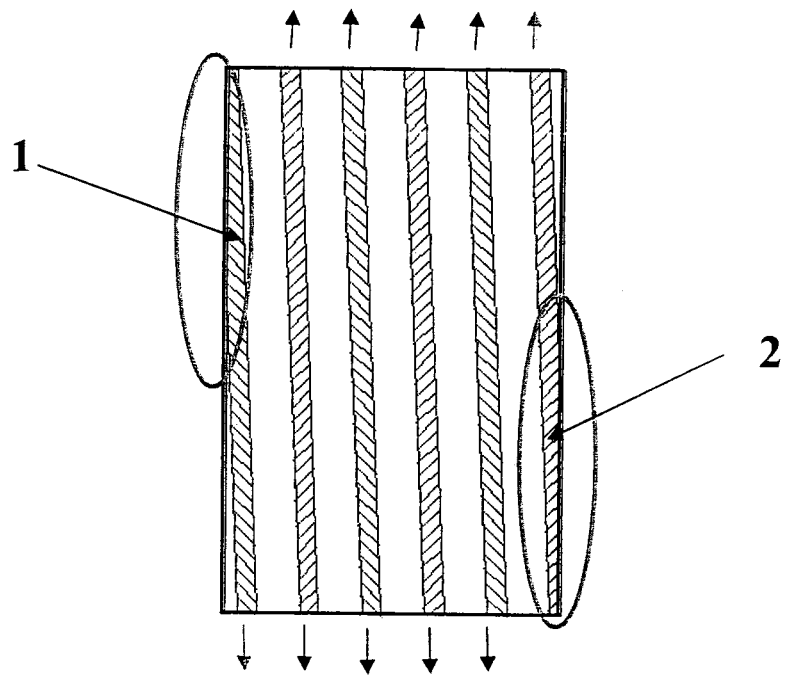
FIG. 1 is a schematic and partial view of a cross section of a poly-V belt where the resistant inserts are highlighted.
Figure 4:
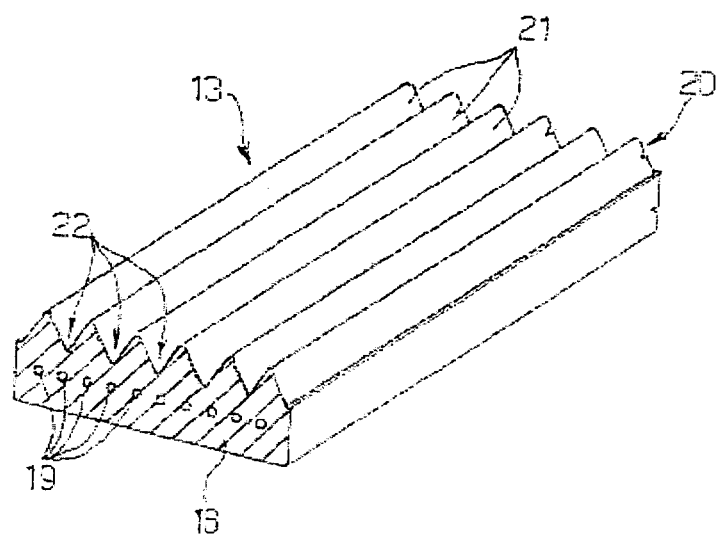
FIG. 4 is a view of a portion of a poly-V belt according to the present invention.

With reference to FIG. 4, the belt 10 comprises a body 18 made of elastomeric material, a plurality of filiform resistant inserts 19 parallel to and set alongside one another and longitudinally embedded in the body 18, and a coupling portion 20 defined by a plurality of V-shaped ribs 21 parallel to and set alongside one another, extending integrally from the body 18 and in the longitudinal direction with respect to the body itself so as to form V-shaped grooves 22 each comprised between two adjacent ribs 21.

In general, known poly-V belts comprise resistant inserts made of polyester that have values of dynamic modulus of between 15 000 and 30 000 N/rib/branch, where these values have been obtained via measurement on the MTS apparatus with a tensile force pre-set at 600 N/rib/branch with a sinusoidal variation of ±400 N/rib/branch at 15 Hz after 10 000 cycles.

Advantageously, a poly-V belt according to the present invention comprises resistant inserts 19 with a value of dynamic modulus, at a tensile force pre-set at 600 N/rib/branch with a sinusoidal variation of ±400 N/rib/branch at 15 Hz, that after 10 000 cycles is higher than 110 000 N/rib/branch. Advantageously, the dynamic modulus is comprised between 110 000 N/rib/branch and 200 000 N/rib/branch. Even more advantageously, the dynamic modulus is comprised between 125 000 N/rib/branch and 175 000 N/rib/branch.

The body 18 and the coupling portion 20 can be made of any elastomeric material suitable for the application.

Preferably the body is made of EPDM.

The resistant inserts 19 are preferably constituted by the coils of a continuous filiform resistant element or "cord", wound in a helix.

The cords preferably comprise carbon fibre or PBO.

Alternatively, the cords can also be of the so-called "hybrid" type, i.e., made of at least one first material and one second material.

It has in fact been discovered that, using resistant inserts 19 formed by two different materials in the form of fibres or filaments intertwined to obtain poly-V belts in a starter-alternator assembly, it is possible to solve the drawbacks of known belts described above.

In particular, the use of resistant inserts 19 made of two materials in the form of different fibres or filaments enables a better adhesion of the resistant insert 19 itself to the mix constituting the body of the belt 1.

The resistant inserts 19 are preferably treated with a composition with a base of latex, resorcinol and formaldehyde, also known as RFL. Preferably, the RFL used comprises a latex formed by a monomer containing nitrile groups and by a diene, for example, HNBR or hydrogenated acrylonitrile butadiene. Preferably, the latex has a base constituted by a copolymer formed starting from a diene and from a monomer containing nitrile groups in a percentage comprised between 33 and 49 wt % with respect to the weight of the final copolymer.

In the case where the resistant inserts comprise two fibre materials, both the first material and the second material used to obtain the resistant inserts according to the present invention are preferably chosen in the group constituted by glass fibres, aramide fibres, polyester fibres, carbon fibres, PBO fibres, polyamide fibres, polyketone (POK) fibres, PEEK fibres, poly-vinyl-acetate (PVA) fibres, liquid-crystal-polymer (LPC) fibres, and PEN fibres.

The first material preferably has a modulus lower than the second material and is preferably wound around the second material.

Preferably, in cross section the second material occupies a surface comprised between 15 and 75% with respect to the overall surface of the cross section itself. Still more preferably, the second material occupies a surface comprised between 45 and 55% with respect to the overall surface.

Hence, basically even more advantageously in cross section the fibres of the two materials occupy similar surfaces so as to balance as much as possible the positive characteristics of both to obtain the best performance on the belt.

The first material is preferably glass fibre, and the second material is preferably carbon fibre.

Preferably, the fibres of the first material are wound around the fibres of the second material so as to coat externally the fibres of the first material at least partially, even more preferably so as to coat the fibres of the second material entirely.

Preferably, the inserts according to the present invention present a twisting of the Lang's Twist type, i.e., with two twists in the same direction, in so far as said embodiment has proven particularly effective.

The number of filaments that form a resistant insert, as likewise the number of basic filaments or the titre or the entire embodiment of the insert, may be varied without departing from the present invention.

The poly-V belt 10 is obtained according to commonly known methods, which are hence not described in detail.

Figure 5:
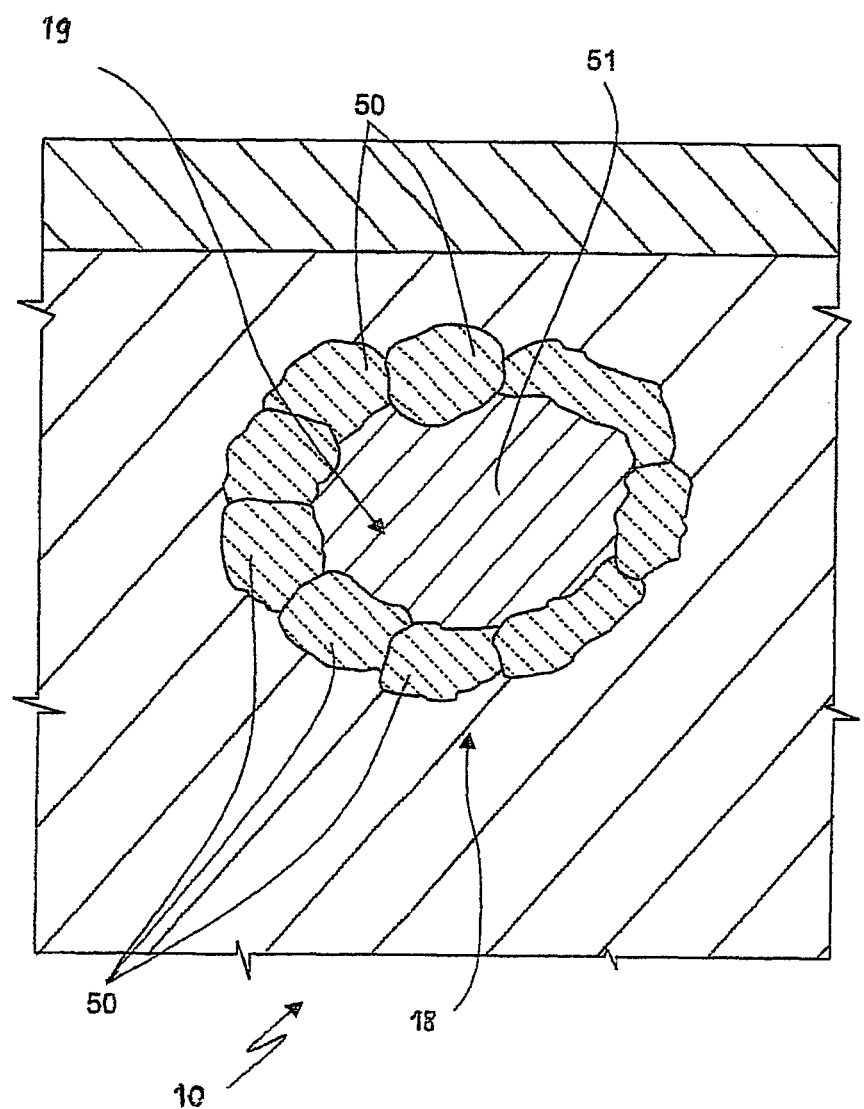
FIG. 5 is a view of a portion of belt including a resistant insert made according to a preferred embodiment of the $1q$.

A purely indicative example of a resistant insert 19 made according to the present invention is described in what follows and illustrated in FIG. 5, where designated by the number 50 are nine twists of a first material that surround entirely one twist designated by the number 51 made of a second material. The first material is glass fibre, the second material is carbon fibre. The glass fibres are wound around the carbon fibres so as to coat the carbon fibres entirely.

In order to form this resistant insert 19 three filaments of glass are treated with a treatment with an adhesive-composition base, for example RFL, and are then twisted a first time to form a twist. Then, a certain number of these twists are wound around one twist of carbon fibre. FIG. 5 exemplifies the case where the twists are nine in number.

In this way, the twists form an insert of a size of between 0.7 and 1.4 mm, in particular 1.15 mm if the embodiment is 34 tex 3*9, 400 tex*1.

The first twisting operation to which the filaments are subjected to form the twists consists of a number of twists equal to 80 in a first direction S (clockwise direction).

The second twisting operation to which the twists are subjected when they are wound around the carbon fibre again consists of 80 twists and is performed in the same direction S so as to form resistant inserts referred to as S.

These resistant inserts consequently present a twisting of the Lang's twist type i.e., they have two twists in the same direction.

The twists that the filaments of carbon fibre undergo to form a twist are 40 and also these are in the same first direction S.

Using the same method and the same procedure, resistant inserts 19 are also formed twisted both times in a direction opposite to the first direction, i.e., in a direction referred to as Z (counterclockwise direction) to form resistant inserts Z.

In order to form a poly-V belt according to the present invention, the resistant inserts S and Z are then simultaneously deposited on the mould with a spiralling pitch comprised, for example, between 1.5 and 5 mm, advantageously between 2.0 and 3.5 mm, more advantageously between 2.1 and 2.6 mm, for example 2.56 mm, where by this measurement is to be understood the distance between two resistant inserts with the same twisting.

The spiralling pitch proves to be particularly important to obtain a modulus designed to overcome the problems that gave rise the present invention.

For example, to provide the resistant insert described previously, for the poly-V belt a value of modulus has been obtained equal to 154.270 N/rib/branch with a pitch of 2.56 mm, and to 133.701 N/rib/branch with a pitch of 3.00 mm.

From an examination of the characteristics of the belt 10 made according to the present invention, the advantages that it enables are evident.

Using a poly-V belt in a starter-alternator assembly according to the present invention, considerable improvements have been achieved and, in particular, it has been possible to overcome the problems referred to previously and withstand 300 000 starts.

The belt 10 will be described in what follows with reference to examples, even though its embodiment is not limited to said examples.

Examples 1-3

Elongation tests were conducted on resistant inserts of a belt made according to the invention and according to the known art.

The specifications of the tests derive from the SAEJ2432 standard, with the introduction of some modifications, given in what follows, in the dimensions of the pulleys and in the environmental conditions so as to render the testing conditions more stringent.

Figure 6:
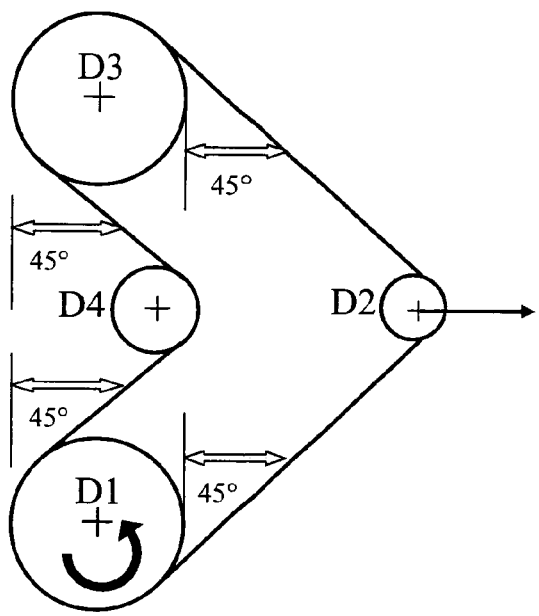
FIG. 6 is a schematic illustration of the belt drive used for conducting the SAE tests for measuring elongation of the resistant insert.
Figure 7:
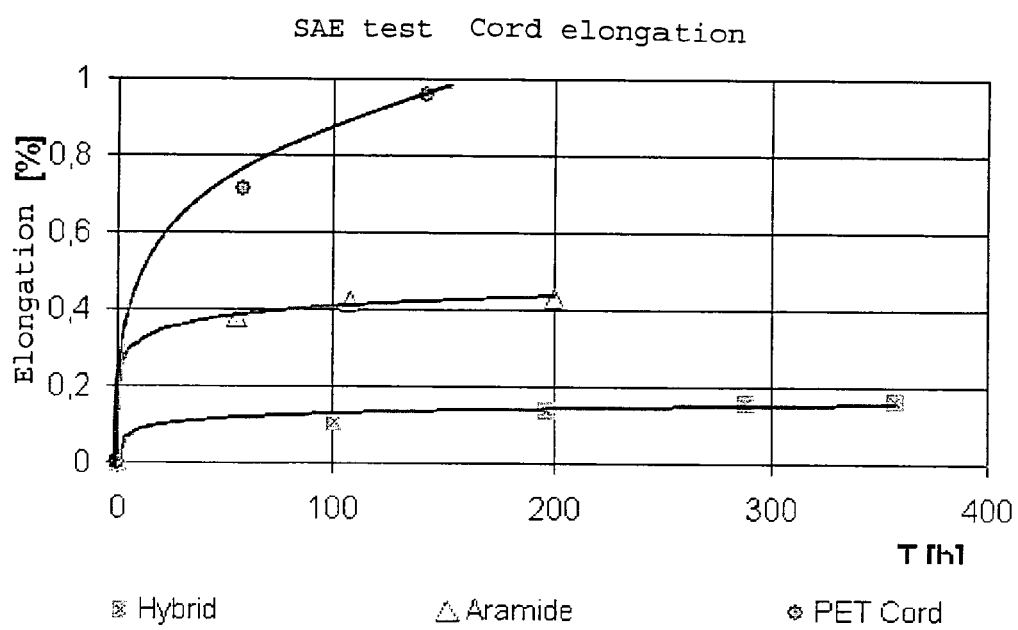
FIG. 7 is a graph that shows the results of the tests conducted with the belt drive of FIG. 6 for a belt made according to the present invention and for belts made according to the known art.

The belts were tested in the drive assembly envisaged by the standard and illustrated in FIG. 6, whilst the results of the tests are shown in FIG. 7.

The test was conducted by installing the belt and then setting a tensile force of the belt of 100 N/rib using a dead weight designated by D2 in the figure.

The belts tested had a body made of EPDM, three ribs, and an effective length of 1050 mm (whilst the standard envisages a length of 1200 mm).

The pulleys of the drive assembly had the following diameters:
D1 (drive pulley) 120 mm
D2 (idler) 45 mm
D3 (driven pulley) 120 mm
D4 (idler on the back) 60 mm (flat).
The conditions of the test were the following:
Ambient temperature=115° C.
Speed of the drive pulley=5000 RPM
Power of the driven pulley=7.4 kW According to the SAE standard, a torque of 20 Nm was moreover applied on a belt with six ribs, hence 3.3 Nm/rib, whilst for these tests torques were used of 14 Nm on belts with three ribs thus obtaining a tensile force on the rib higher than in the tests according to the standard, i.e., 4.8 Nm/rib.

All the belts had a body made of EPDM and differed as regards the type of resistant inserts used. From the results of the test, it emerged clearly that the poly-V belts including resistant inserts indicated as PET, i.e., with a polyethylentherephthalate base, and aramide, i.e., of aromatic polyamide, presented elongations that were much greater than those including hybrid resistant inserts, i.e., ones made of two different fibre materials, in the case of the present example, carbon fibre wound by glass filaments according to the structure shown in FIG. 5.

The different elongations result from a different dynamic creep and result in a much shorter duration of the belt; in particular, the belt including resistant inserts made of PET after 100 hours presented an elongation of approximately 0.8% so that it no longer functioned properly, whilst the belt with polyaramide resistant inserts presented the same elongation after approximately 200 hours, and the belt according to the invention with a cord made of different materials after more than 350 hours.

Examples 4-6

Figure 8:
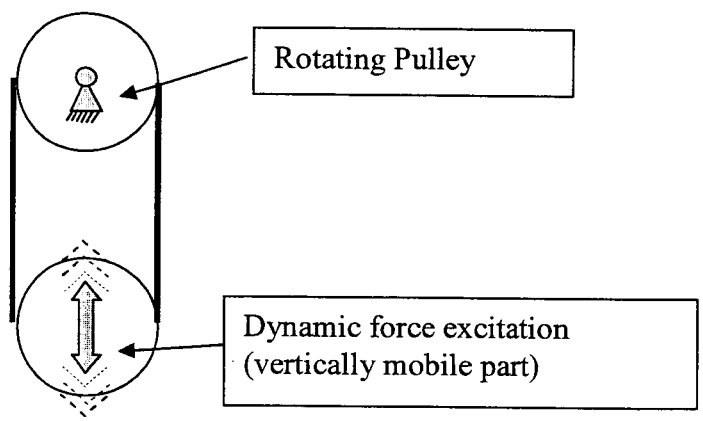
FIG. 8 is a schematic illustration of the belt drive used for conducting tests for identifying the dynamic modulus.

Tests were performed applying a tensile force set using an MTS dynamic pulsator, the instrumentation described in the patent No. EP1669637<), in a drive assembly as schematically illustrated in FIG. 8. Tests for measurement of the dynamic modulus on poly-V belts with said types of instrumentation are also described in the patent No. EP1669637, but said tests are extremely complex. The tests were conducted with a simplified procedure so as to ensure a better reproducibility.

Figure 9:
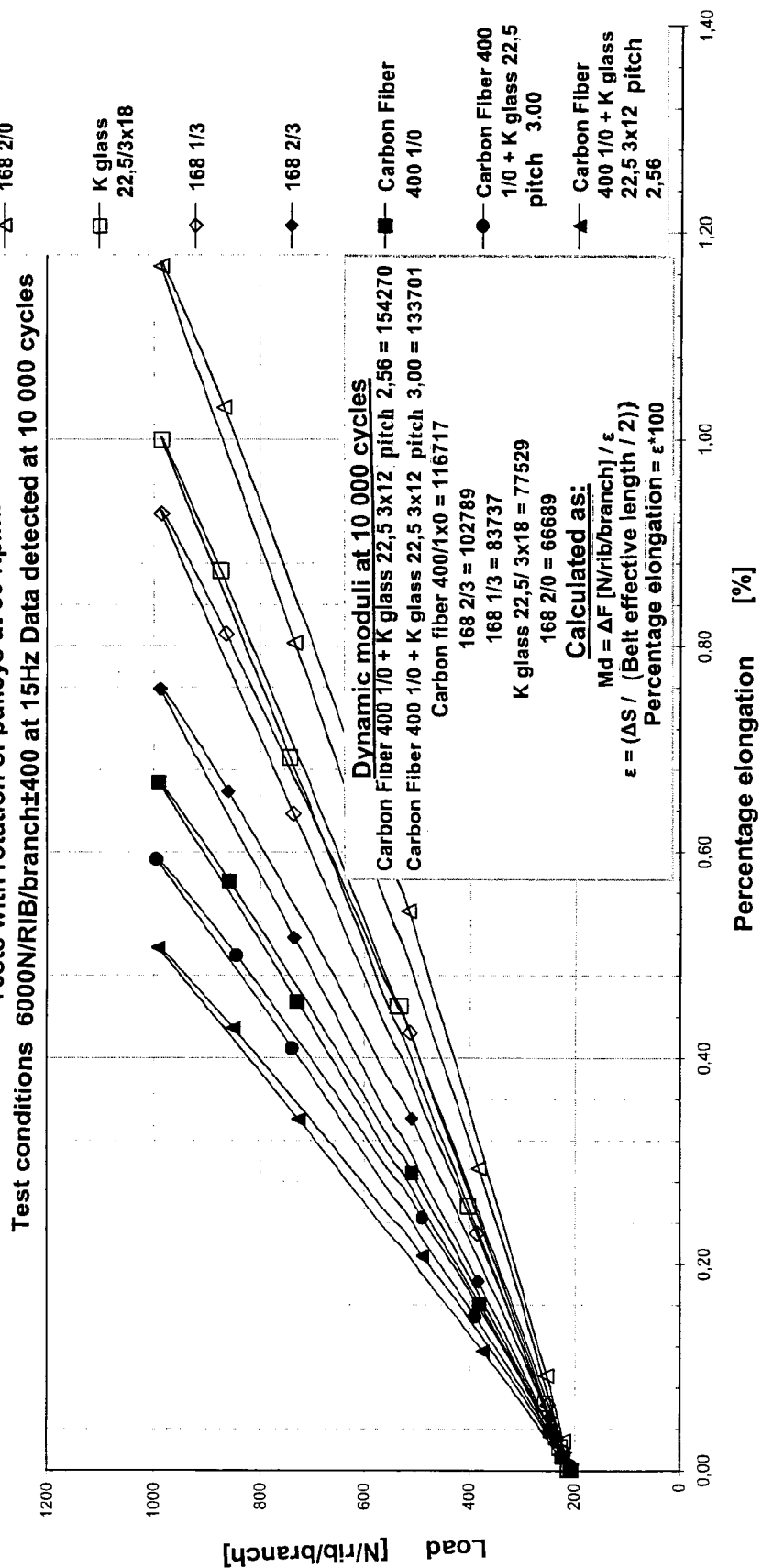
FIG. 9 is a graph that shows the results of the tests conducted with the belt drive of FIG. 8 for a belt made according to the present invention and for belts made according to the known art.

The results of the tests conducted appear in FIG. 9, which compares poly-V belts comprising resistant inserts made according to the known art, and precisely of aramide, with poly-V belts comprising resistant inserts made of two different materials (hybrid inserts) and precisely with a carbon-thread structure wound by glass filaments as illustrated in FIG. 5 and resistant inserts made of carbon alone.

The materials and the characteristics of the cords appearing in the graph are given in the table below.

| Material | Embodiment (Tex) | Twists First Twist | Final Twist |
|---|---|---|---|
| Technora | 168.2/0 | — | 120 |
| Technora | 168.1/3 | 110 | 60 |
| Technora | 168.2/3 | 170 | 140 |
| K glass | 22.5/3 × 18 | 80 | 72 |
| Carbon Fiber | 400.1/0-68 | — | 68 |
| Carbon Fiber + K glass | CF(400 1/0 + K glass 22.3 × 12) | — | 68 |

The pulleys with ribs used for the tests had an external diameter of 95.5 mm according to the standard SAE9981.

The test was conducted at an ambient temperature of 20° C.±5° C.

The belt was mounted on the pulleys of the machine. Then the average tensile force was set at a value of 600 N/rib/branch. Rotation of the pulleys was started until a value of 50 r.p.m. of the pulley was reached.

The desired loading conditions were applied with a sinusoidal waveform at 15 Hz.

In the tests conducted, the tensile force ranged from a minimum of 200 to a maximum of 1000 N/rib/branch, hence 600±400 N/rib/branch.

The values of force and displacement were then recorded after 10 000 cycles carried out in the condition set.

The modulus was calculated taking into account the following definitions:

Delta force applied (i.e., maximum force−minimum force and hence in the tests conducted 1000−200=800), defined as ΔF.

Delta displacement of cross member detected by the machine defined as ΔS.

Elongation ε.

The elongation is =ΔS*2/belt effective length.

The dynamic modulus Md results from the formula

Md=ΔF [N/rib/branch]/ε where

ε=(ΔS/(belt effective length/2))

percentage elongation=ε*100.

The length of the belt for the tests was 1050 mm.

The pulleys were kept in rotation throughout the test.

As may be clearly seen from the graph of FIG. 9, the moduli of the poly-V belts used were of an order of magnitude greater than those of the known belts.

Unlike the belts of the known art and the belts currently available on the market, it has been possible to verify that the use of poly-V belts with a dynamic modulus, at a tensile force pre-set at 600 N/rib/branch with a sinusoidal variation of ±400 N/rib/branch at 15 Hz, which, after 10 000 cycles, is higher than 110 000 N/rib/branch, makes it possible to solve the aforementioned problems of starter-alternator assemblies and in particular to more than satisfy the specifications imposed by automobile manufacturers of 300 000 starts.

The invention claimed is:

1. A starter-alternator assembly comprising:
   a belt drive that connects an engine shaft of an internal combustion engine with a reversible electric machine comprising
   a poly-V belt, which in turn comprises a body made of elastomeric material, a plurality of filiform resistant inserts longitudinally embedded in the body and constituted as a hybrid cord, and
   a coupling portion integrally connected to said body and comprising a plurality of continuous V-shaped ribs set alongside one another and alternating with continuous V-shaped grooves, wherein said continuous V-shaped ribs alternate with continuous V-shaped grooves along the entire length of the belt;
   wherein said belt of said assembly has a dynamic modulus, at a tensile force preset at 600 N/rib/branch with a sinusoidal variation of ±400 N/rib/branch at 15 Hz, that after 10 000 cycles is higher than 110 000 N/rib/branch,
   wherein the belt comprises EPDM, and
   wherein said hybrid cord comprises fibers of a first material comprising glass fibres and fibres of a second material comprising carbon fibres, and the fibres of the first material are wound around the fibers of the second material such that the fibres of first material externally coat the fibres of second material.

2. The assembly according to claim 1, wherein said modulus is comprised between 110 000 N/rib/branch and 200 000 N/rib/branch.

3. The assembly according to claim 2, wherein said modulus is comprised between 125 000 N/rib/branch and 175 000 N/rib/branch.

4. The assembly according to claim 1, wherein the starter-alternator assembly further comprises at least one tensioner, comprising at least one rigid element connected in such a way that the belt can turn around a first axis.

5. The assembly according to claim 4, wherein said tensioner comprises a pair of idler pulleys supported by said rigid element on opposite sides of said first axis and designed to co-operate with respective branches of said belt drive.

6. The assembly according to claim 4, wherein said drive assembly comprises a tensioner, comprising two arms, said arms being elastically connected to one another and being able to rotate with respect to a fixed casing.

7. The assembly according to claim 4, wherein said drive assembly comprises a tensioner, comprising two arms, said arms being rigidly connected to one another.

8. A poly-V belt for a starter-alternator assembly configured to connect an engine shaft of an internal combustion engine with a reversible electric machine comprising
   a body made of elastomeric material, a plurality of filiform resistant inserts longitudinally embedded in the body and constituted as a hybrid cord, and
   a coupling portion integrally connected to said body and comprising a plurality of continuous V-shaped ribs set alongside one another and alternating with continuous V-shaped grooves, wherein said continuous V-shaped ribs alternate with continuous V-shaped grooves along the entire length of the belt
   wherein said belt presents a dynamic modulus, at a tensile force preset at 600 N/rib/branch with a sinusoidal variation of ±400 N/rib/branch at 15 Hz, which after 10 000 cycles is higher than 110 000 N/rib/branch, wherein the belt comprises EPDM, and wherein said hybrid cord comprises fibers of a first material comprising glass fibres and fibres of a second material comprising carbon fibres, and the fibres of the first material are wound around the fibers of the second material such that the fibres of first material externally coat the fibres of second material.

9. The belt according to claim 8, which presents a dynamic modulus comprised between 125 000 N/rib/branch and 175 000 N/rib/branch.

10. The belt according to any one of claim 8, wherein said resistant inserts are of the type known as "Lang's twist" or double winding.

* * * * *